Figure 1:
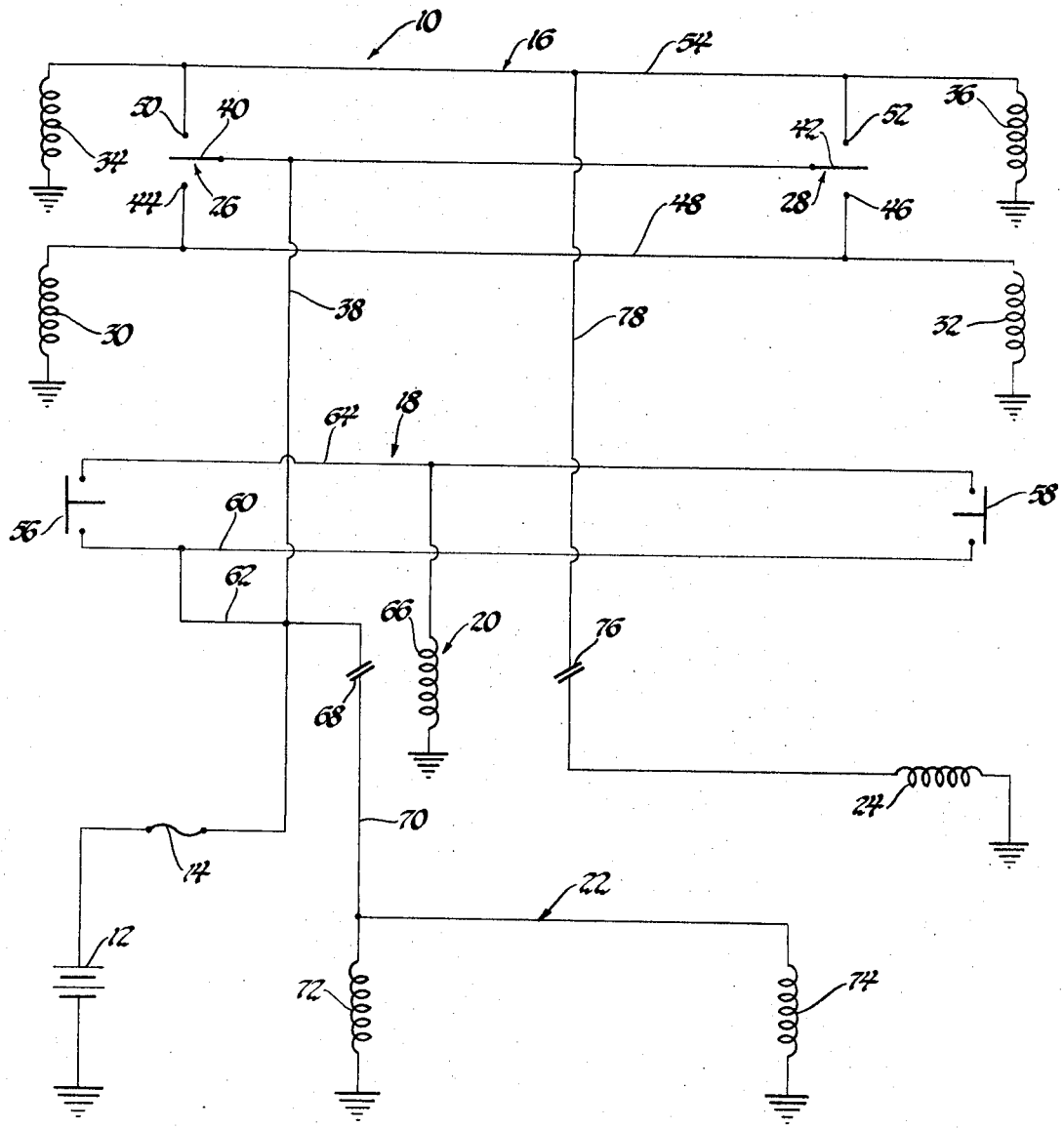

United States Patent
Ballou

[15] 3,657,553
[45] Apr. 18, 1972

[54] REMOTE DOOR UNLATCHING APPARATUS
[72] Inventor: Richard P. Ballou, Howell, Mich.
[73] Assignee: General Motors Corporation, Detroit, Mich.
[22] Filed: Nov. 30, 1970
[21] Appl. No.: 93,519

[52] U.S. Cl. ................................................307/10, 180/111
[51] Int. Cl. ............................................................H02g 3/00
[58] Field of Search ....................180/111, 112, 113; 307/10, 307/10 AT; 340/62, 64

[56] References Cited

UNITED STATES PATENTS

| | | | |
|---|---|---|---|
| 3,074,502 | 1/1963 | Deibel et al. | 180/112 |
| 3,084,757 | 4/1963 | Oishei et al. | 180/112 |
| 3,516,704 | 6/1970 | Riester | 180/111 |

*Primary Examiner*—Herman J. Hohauser
*Attorney*—Jean L. Carpenter and Paul Fitzpatrick

[57] ABSTRACT

Apparatus for unlatching the passenger door of a vehicle from the driver's side of the vehicle by placing a door lock switch in a door unlocking setting while a driver's side door is open. On opening the driver's door a relay effects energization of seat unlatching solenoids to facilitate ingress and egress of passengers. In the door unlocking setting the switch energizes solenoids which unlock the vehicle doors and, with the driver's side door open, effects energization of a door unlatching solenoid at the passenger door. In an alternative embodiment placing the switch in the door unlocking setting when an auxiliary switch is closed effects energization of the door unlatching solenoid.

5 Claims, 3 Drawing Figures

INVENTOR.
Richard P. Ballou
BY
Paul Fitzpatrick
ATTORNEY

INVENTOR.
Richard P. Ballou
BY
Paul Fitzpatrick
ATTORNEY

REMOTE DOOR UNLATCHING APPARATUS

This invention relates to systems for unlatching vehicle doors, and more particularly, to a system for unlatching both a vehicle passenger's door and the backs of the vehicle's front seats from the driver's seat of the vehicle.

Many convenience features are presently in widespread usage by the motoring public to enhance their motoring pleasure. For example, virtually all vehicles presently in use employ lighting systems which automatically illuminate the interior of the vehicle in response to opening one or more of the vehicle's doors. A convenience feature which has more recently been available to the motoring public is a power door lock system in which several vehicle doors may be locked or unlocked by manually manipulating any one of a number of switches which are conveniently located adjacent each of the respective doors. Another example of a recent convenience feature being offered the motoring public is an automatic seat back release system in which seats secured to a pivotal mounting are normally in a latched position but are unlatched automatically when one or more of the vehicle doors are opened. This latter convenience feature is especially useful in a vehicle having two rows of seating in a passenger compartment to which access may be had by entering through either of two doors. In vehicles of this type it is customary to latch the backs of the seats in the front row in a substantially upright position. While in many motor vehicles access may be had to the rear seats only by manually unlatching the backs of the front seats, an automatic seat back unlatching system provides more ready access to the rear seats by automatically unlatching the backs of the front seats whenever one of the vehicle doors is opened.

While each of the foregoing features makes motoring more pleasurable, it has been observed that many persons who may be passengers in a vehicle are unable to exit from the vehicle without assistance. Among these persons, of course, are those who are merely unfamiliar with the location and operation of the handle provided for unlatching the vehicle door. In addition, many of these persons who require assistance are handicapped so as to be unable to operate the door handle even if they know its location. Young children may also be included in this latter category as often the force which must be exerted on the door handle before the door opens is beyond their limited capabilities. However, in most instances persons in the foregoing categories are able to leave the vehicle unassisted once the door has been unlatched for them as an unlatched door may be opened by merely pushing on the interior surface of the door. These persons also, in most instances, are able to properly close the door once they have left the vehicle as closing the door generally requires only a push on its exterior surface, the door generally being latched automatically when it is fully closed.

It is therefore an object of this invention to provide apparatus for unlatching the passenger door of a vehicle from the driver's side of a vehicle by opening a driver's side door while a switch is manipulated by either the driver or a passenger.

It is also an object of this invention to provide apparatus which will unlock the doors of a vehicle when a switch is placed in a door unlocking setting and will unlatch a certain door of the vehicle when another vehicle door is open.

It is an additional object of this invention to provide apparatus for a vehicle which, upon placing a switch in a door unlocking setting and opening the driver's door of the vehicle, unlocks and unlatches the passenger's side door of the vehicle and unlatches the vehicle seats to facilitate egress from both the front and rear seats of the vehicle.

Figure 2:
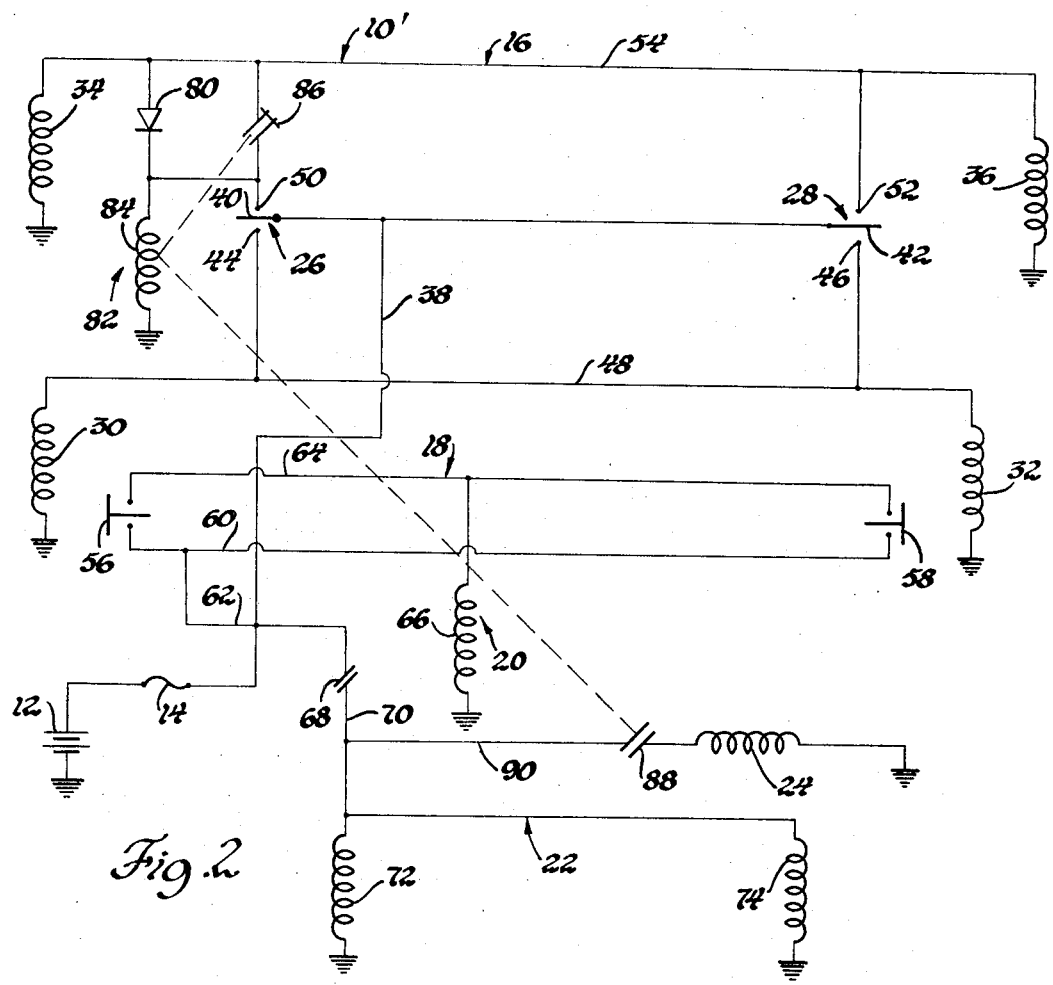
Figure 3:
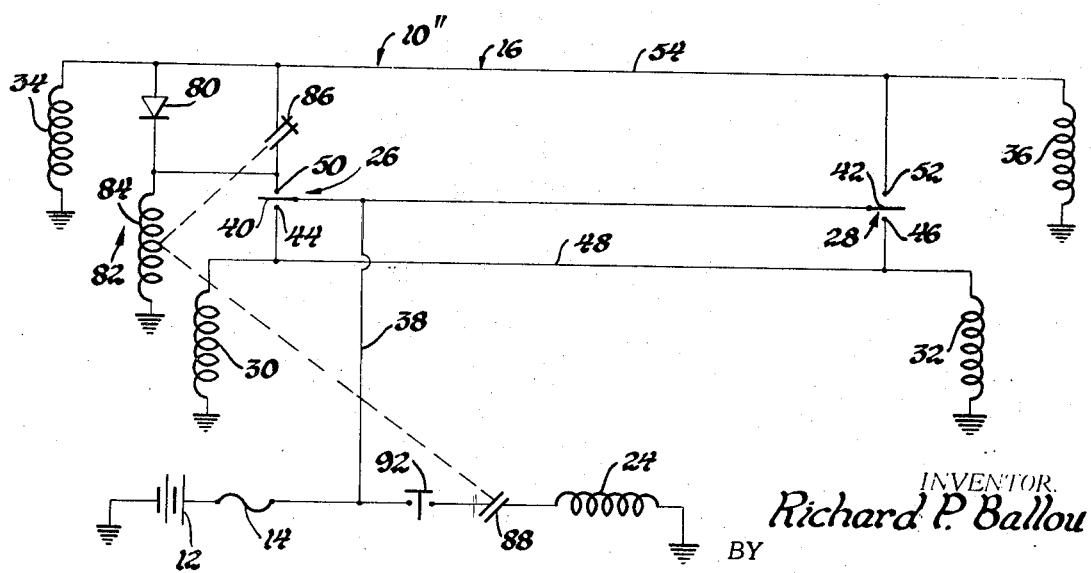

The foregoing and other objects and advantages of the subject invention will be apparent from the following description and accompanying drawings, in which FIG. 1 discloses a vehicle door unlatching system embodying the principles of the subject invention and FIGS. 2 and 3 disclose alternative embodiments of the system in FIG. 1.

As is shown in FIG. 1, a vehicle door unlatching system 10 embodying the principles of the subject invention is powered by a suitable power source, such as a vehicle battery 12, through a fuse 14 and includes a door locking network 16, a door switch network 18, a relay 20, a seat unlatching network 22, and a door unlatching solenoid 24.

For descriptive purposes the structural features of the system 10 will now be described in detail as it is contemplated they would appear in a motor vehicle of the two door sedan style. That is, in a motor vehicle having a passenger compartment which contains a row of front seats and a row of rear seats with access to the seats being provided by a single door at either side of the front seats. Since it is customary in the United States for the vehicle driver to sit on a front seat at one side of the vehicle, this description may be simplified by defining the left side of the vehicle as the driver's side and the right side of the vehicle as the passenger's side. Accordingly, access to the rear seat area of the passenger compartment may be achieved by unlatching the back of either the driver's or passenger's seat, tilting forward the back of the unlatched seat, and entering the passenger compartment through either the driver's or passenger's door.

The door locking network 16 includes driver and passenger door lock switches 26 and 28 that are manually operable and may be conveniently mounted on the interior surface of the respective driver's and passenger's doors. In addition, the door locking network 16 includes a pair of door lock solenoids 30 and 32 and a pair of door unlocking solenoids 34 and 36 for locking and unlocking the respective driver's and passenger's doors. The door lock switches 26 and 28 are connected by a lead 38 to the battery 12. Accordingly, when either of the switches 26 and 28 is placed in a door lock setting the corresponding switch arm 40 or 42 engages the appropriate contact 44 or 46 and both of the door lock solenoids 30 and 32 are energized through a lead 48. When the door lock solenoids 30 and 32 are energized they lock the driver and passenger doors through suitable lock mechanisms which are well known to persons versed in the art. By way of example, and without limitation, these mechanisms may be of the type employed in Fox et al. U.S. Pat. No. 3,190,682. Conversely, when either of the switch arms 40 or 42 is placed in a door unlocking setting it engages the corresponding contact 50 or 52 so as to effect energization of the door unlock solenoids 34 and 36 through a lead 54. When the solenoids 34 and 36 are energized they activate the lock mechanisms of the respective driver's and passenger's doors to allow for opening and closing of these doors.

The door switch network 18 includes a driver's door switch 56 and a passenger's door switch 58 that are connected to the battery 12 through a pair of leads 60 and 62. The other sides of the door switches 56 and 58 are connected through a lead 64 to the relay winding 66 of the relay 20. The door switches 56 and 58 in the illustrated embodiment are positioned so as to be responsive to the position of the driver's and passenger's doors so that when one of the doors is open the corresponding door switch 56 or 58 is closed and when the door is closed the corresponding switch 56 or 58 is opened. Accordingly, when both of the vehicle doors are closed the door switches 56 and 58 are opened. However, should either of the vehicle doors be open the corresponding door switch 56 or 58 effects energization of the relay winding 66.

When the relay winding 66 is energized it closes a pair of normally open relay contacts 68 that connect the seat unlatching network 22 to the power source 12 through a lead 70. The seat unlatching network 22 includes a pair of seat unlatching solenoids 72 and 74 for unlatching the backs of the respective driver's and passenger's seats. As previously mentioned, it is contemplated in the illustrated embodiment that the driver and passenger seats are normally maintained in a substantially upright position, i.e., the backs of the seats are at a higher elevation than the remainder of the seats, and are rigidly latched in a fixed position relative to the remainder of the seats. Accordingly, when either of the door switches 56 or 58 is closed by opening one of the vehicle doors the relay 20 is energized so as to close the contacts 68 and energize the seat unlatching solenoids 72 and 74. When the seat unlatching solenoids 72 and 74 are energized convenient access to the rear seat of the vehicle is provided merely by pushing forward the back of either the driver's or passenger's seat.

Energization of the relay 20 also closes a second set of normally open contacts 76 which complete a current path through a lead 78 from the lead 54 of the door locking network 16 to the door unlatching solenoid 24. Since the lead 54 is connected to the battery 12 whenever one of the door lock switches 26 or 28 is placed in the door unlocking setting the door unlatching solenoid 24 may be energized whenever the winding 66 of the relay 20 is energized while one of the door lock switches 26 or 28 is in the door unlocking setting. The door unlatching solenoid 24 is connected to a suitable door latch in the passenger's door of the vehicle so that the passenger's door may be opened merely by pushing the interior surface of the door whenever the door unlatching solenoid 24 is energized. By way of example, and without limitation, a latch mechanism of this type is disclosed in Gaffney U.S. Pat. No. 2,218,038.

From the foregoing description the operation of the system 10 is somewhat obvious, through it will now be briefly explained to assure that it is understood. Whenever one of the vehicle doors is open, as upon entering the vehicle, the corresponding door switch 56 or 58 is closed and the relay winding 66 is energized, causing the seat unlatching solenoids 72 and 74 to become energized. Accordingly, opening of a vehicle door automatically unlatches the vehicle seats in the front row of the passenger compartment to provide easy access to the space behind the front row of seats.

While the vehicle is being operated either of the door lock switches 26 or 28 may be placed in the door locking setting to energize the door lock solenoids 30 and 32 so as to lock the doors. When the passengers wish to leave the vehicle either of the door lock switches 26 or 28 may be placed in the door unlocking setting so as to energize the door unlocking solenoids 34 and 36 and thus unlock the doors. However, should the door switch 56, which is responsive to the driver's door be closed due to the driver's door being opened while one of the door lock switches 26 or 28 is held in the door unlocking setting, the resulting energization of the relay winding 66 and closure of the contacts 76 causes the door unlatching solenoid 24 to unlatch the passenger's door. The driver of the vehicle may thus unlatch the passenger door merely by opening the driver's door while holding the door lock switch 26 in the door unlocking setting. As persons versed in the art will appreciate, once the driver has unlatched the passenger's door very little effort needs to be exerted on the passenger's door by a passenger wishing to leave the vehicle. The door switch 58, which is responsive to the passenger's door, will maintain the relay winding 66 energized so as to maintain the seat unlatching solenoids 72 and 74 energized. Accordingly, once the passenger has alighted from the vehicle the passenger will have ready access to the area behind the front seat, as previously explained, should such be needed for gathering parcels and so forth. After leaving the vehicle the passenger merely needs to push the passenger's door shut to the point where it is automatically latched for subsequent secure operation of the vehicle.

In the embodiment disclosed in FIG. 2 the system 10 of FIG. 1 is modified by both the addition of a diode 80 and a second relay 82 that includes a second relay winding 84, a set of normally closed contacts 86, and a set of normally open contacts 88 and the deletion of the lead 78 and the normally open contacts 76. The second relay winding 84 is connected to the door lock switch 26 so as to be energized when either of the door lock switches 26 or 28 is placed in a door unlocking setting. However, for reasons soon to be described, the second relay 82 is designed so the normally closed contacts 86 are not opened until a predetermined time, which may be on the order of a fraction of a second, has elapsed after one of the door lock switches 26 or 28 is placed in the door unlocking setting.

As persons versed in the art will appreciate, many relays having a time delay such as this are in widespread usage and hence a further description of the second relay 82 is unnecessary. By way of example, and without limitation, the second relay 82 may be one in which the current path through the second relay winding 84 contains such a large inductance as not to allow energization of the second relay winding 84 for the predetermined time. In the alternative, the second relay 82 may be of a type in which the second relay winding 84 may be immediately energized but in which the mechanical action of the normally closed contacts 86 is delayed for the predetermined time.

Upon placement of the door lock switch 26 in the door unlocking setting the battery 12 is connected through the switch arm 40 to the second relay winding 84 and, through the normally closed contacts 86, to the door unlocking solenoids 34 and 36. Even though the potential of the battery 12 is applied to the second relay winding 84 the normally closed contacts 86 remain closed until the predetermined time has elapsed, which time is selected to assure both that the door unlocking solenoids 34 and 36 are energized and that the respective doors of the vehicle are unlocked. Should the driver's door switch 56 be closed by opening the driver's door while the second relay winding 84 is energized the normally open contacts 68 are closed in the fashion previously explained. This effects energization of the door unlatching solenoid 24 by the battery 12 through the lead 90 and the normally open contacts 88, which are closed whenever the second relay winding 84 is energized. An important advantage of the FIG. 2 embodiment is that after the predetermined time has elapsed the door unlocking solenoids 34 and 36 do not draw additional current even though the door lock switch 26 is held in the door unlocking setting. This advantage is provided by the normally closed contacts 86 because when they are opened the driver's door lock switch 26 cannot effect energization of the door unlocking solenoids 34 and 36.

The second relay winding 84 may also be energized by placing the passenger's door lock switch 28 in the door unlocking setting. When this is done the second relay winding 84 is energized through the normally closed contacts 86 while they are closed and is energized through the diode 80 when they are open. The diode 80 thus maintains the second relay winding 84 energized so long as the door lock switch 28 is held in the door unlocking setting. Subsequently opening the driver's door will therefore effect energization of the door unlatching solenoid in the manner just explained.

In the FIG. 3 embodiment the system 10″ allows energization of the door unlatching solenoid 24 merely by placing one of the door lock switches 26 or 28 in the door unlocking setting and closing an auxiliary switch 92 that may, by way of example, be a pushbutton switch conveniently mounted at a point in the dashboard of the vehicle that is within reach of the vehicle driver. The auxiliary switch 92 is connected in series with the battery 12, the normally open contacts 88, and the door unlatching solenoid 24. Accordingly, when the normally open contacts 88 are closed by placement of a door lock switch 26 or 28 in the door unlocking setting in the fashion explained in regard to FIG. 2, the driver may energize the door unlatching solenoid 24 merely by closing the auxiliary switch 92. The FIG. 3 embodiment therefore allows the vehicle driver to unlatch the passenger's door without having to open the driver's door in the manner of the embodiments disclosed in FIGS. 1 and 2.

While the aforegoing description has been directed toward the illustrated embodiments of this invention persons versed in the art will appreciate that various modifications of this invention may be made without departing from its spirit.

What is claimed is:

1. In a vehicle having separate driver's and passenger's seats, a driver's door adjacent the driver's seat, and a passenger's door adjacent the passenger's seat, apparatus for facilitating opening of the passenger's door comprising, in combination, a selectively operable switch having first and second operative conditions located proximate the driver's door so as to be responsive thereto whereby closing of the driver's door places the switch in the first operative condition and opening of the driver's door places the switch in the second operative condition; a door lock switch having a door locking setting and a door unlocking setting located proximate the driver's seat for operation by the vehicle driver; door locking means responsive to the door lock switch for locking the doors when the door lock switch is in the door locking setting and for unlocking the doors when the door lock switch is in the door unlocking setting; and door unlatching means responsive to the said switches and operatively coupled to the passenger's door for unlatching the passenger's door when the driver's door is opened while the door lock switch is in the door unlocking setting.

2. In a vehicle having driver's and passenger's seats, at least one of which is normally latched in a substantially upright position, a driver's door adjacent the driver's seat, and a passenger's door adjacent the passenger's seat, apparatus for unlatching one of the doors from the seat adjacent the other door comprising, in combination, a door switch that is responsive to opening of said other door, the switch being in a first operative condition when said other door is closed and in a second operative condition when said other door is open; a door lock switch having a door locking setting and a door unlocking setting located proximate said other door; means for connecting the switches to a power source; a relay that is responsive to the door switch and energized when said other door is open; a door locking solenoid that is responsive to the door lock switch and proximate said one door for locking said one door when the door lock switch is in the door locking setting; a door unlocking solenoid that is proximate said one door and effective when energized to unlock said one door; door unlocking means responsive to the door lock switch and effective to energize the door unlocking solenoid for a predetermined time upon placement of the door lock switch in the door unlocking setting; and door unlatching means responsive both to the relay and to the door unlocking means for effecting unlatching of said one door when said other door is open and the door lock switch is placed in the door unlocking setting.

3. The apparatus of claim 2 in combination with a seat unlatching solenoid that is effective when energized to unlatch the seat, thereby permitting the seat to be moved from the upright position, and means responsive to energization of the relay for connecting the power source to the seat unlatching solenoid when the relay is energized whereby opening of said other door effects unlatching of said seat.

4. In a vehicle having at least two doors, a passenger's seat that is normally latched in a substantially upright position adjacent one of the doors, and a space behind the seat, apparatus for unlatching said one door from a location proximate said other door comprising, in combination, a manually operable door lock switch located proximate said other door and having both a door locking setting and a door unlocking setting; a door locking solenoid proximate said one door for locking said one door when the door locking solenoid is energized; a door unlocking solenoid proximate said one door for unlocking said one door when the door unlocking solenoid is energized; means for connecting the door lock switch and the solenoids to a power source effective to lock said one door when the door lock switch is placed in the door locking setting and to unlock said one door when the door lock switch is placed in the door unlocking setting; a door unlatching solenoid that is effective when energized to unlatch said one door; a relay for controlling the energization of the unlatching solenoid, the relay when energized connecting the door unlatching solenoid to the door unlock solenoid effective to unlatch said one door when the door lock switch is placed in the door unlocking setting; and a door switch that is responsive to opening of said other door for effecting energization of the relay by the power source, the door effecting energization of the relay by the power source, the door switch precluding energization of the relay when said other door is closed and effecting energization of the relay when said other door is open whereby said one door may be unlatched by placing the door lock switch in the door unlocking setting and opening said other door.

5. The apparatus of claim 4 in combination with a seat unlatching solenoid that is effective when energized to unlatch the seat, thereby permitting the seat to be moved from the upright position, and means responsive to energization of the relay for connecting the power source to the seat unlatching solenoid when the relay is energized whereby opening of said other door effects unlatching of said seat.

* * * * *